United States Patent
Sobotowski et al.

(10) Patent No.: US 7,131,402 B2
(45) Date of Patent: Nov. 7, 2006

(54) METHOD FOR CONTROLLING EXHAUST EMISSIONS FROM DIRECT INJECTION HOMOGENEOUS CHARGE COMPRESSION IGNITION ENGINES

(75) Inventors: Rafal A. Sobotowski, Media, PA (US); Charles Hall Schleyer, Lincoln University, PA (US); Kenneth D. Erdman, Peoria, IL (US); Kevin P. Duffy, Metamora, IL (US)

(73) Assignees: Caterpillar Inc., Peoria, IL (US); ExxonMobil Research & Engineering Co., Annandale, NJ (US)

( * ) Notice: Subject to any disclaimer, the term of this patent is extended or adjusted under 35 U.S.C. 154(b) by 0 days.

(21) Appl. No.: 11/115,779

(22) Filed: Apr. 27, 2005

(65) Prior Publication Data

US 2005/0268883 A1    Dec. 8, 2005

Related U.S. Application Data

(60) Provisional application No. 60/571,307, filed on May 14, 2004.

(51) Int. Cl.
*F02B 75/12* (2006.01)
*C10L 1/16* (2006.01)

(52) U.S. Cl. ........................ 123/1 A; 585/14
(58) Field of Classification Search ............... 123/1 A; 585/14
See application file for complete search history.

(56) References Cited

U.S. PATENT DOCUMENTS

| | | | | |
|---|---|---|---|---|
| 4,191,730 A | * | 3/1980 | Batha et al. | 423/239.1 |
| 4,541,835 A | * | 9/1985 | Norton et al. | 44/326 |
| 4,645,585 A | * | 2/1987 | White | 208/58 |
| 4,945,721 A | * | 8/1990 | Cornwell et al. | 60/274 |
| 5,389,111 A | * | 2/1995 | Nikanjam et al. | 44/300 |
| 5,389,112 A | * | 2/1995 | Nikanjam et al. | 44/300 |
| 5,447,703 A | * | 9/1995 | Baer et al. | 423/235 |
| 5,807,413 A | * | 9/1998 | Wittenbrink et al. | 44/451 |
| 5,976,201 A | * | 11/1999 | Barry et al. | 44/413 |
| 5,992,397 A | * | 11/1999 | Hideaki et al. | 123/538 |
| 6,378,489 B1 | | 4/2002 | Stanglmaier et al. | 123/304 |
| 6,662,760 B1 | | 12/2003 | Stanglmaier et al. | 123/3 |
| 6,779,339 B1 | * | 8/2004 | Laroo et al. | 60/297 |
| 2003/0052041 A1 | | 3/2003 | Erwin et al. | 208/15 |
| 2004/0194367 A1 | * | 10/2004 | Clark et al. | 44/301 |
| 2005/0086854 A1 | * | 4/2005 | Millington et al. | 44/385 |

FOREIGN PATENT DOCUMENTS

| | | |
|---|---|---|
| EP | 1371715 | 12/2003 |
| WO | WO 03/025100 A2 | 3/2003 |
| WO | WO 03/025100 A3 | 3/2003 |

OTHER PUBLICATIONS

Kevin Duffy, Eric Fluga, Steve Faulkner, David Heaton, Charles Schleyer, Rafal Sobotowski; "Latest Developments in Heavy Duty Diesel HCCI"; Which Fuels For Low $CO_2$ Engines?; P. Duret (Editor) and Editions Technip, Paris, pp. 1-10; 2004.

(Continued)

*Primary Examiner*—John T. Kwon
(74) *Attorney, Agent, or Firm*—Kenneth Watov; Watov & Kipnes, P.C.

(57) ABSTRACT

A method is disclosed for controlling exhaust emissions from direct injected homogeneous charge compression ignition engines by combusting therein a fuel having a cetane number equal to or less than 50, and aromatic content equal to or greater than 15 wt %.

20 Claims, 12 Drawing Sheets

OTHER PUBLICATIONS

Kevin Duffy, Eric Fluga, Steve Faulkner, David Heaton, Charles Schleyer, Rafal Sobotowski; "Latest Developments in Heavy Duty Diesel HCCI"; Which Fuels For Low $CO_2$ Engines?; P. Duret (Editor) and Editions Technip, Paris, pp. 1-14; 2004.

Thomas W. Ryan III, Andrew C. Matheaus; "Fuel Requirements for HCCI Engine Operation"; SAE Paper 2003-01-1813; JSAE 20030353; 2003 JSAE/SAE International Spring Fuels & Lubricants Meeting, Yokohama, Japan; pp. 1-10;May 19-22, 2003.

Koji Kitano, Ryojl, Nishiumi, Yukihiro Tsukasaki, Toshiaki Tanaka, Masataka Morinaga; "Effects of Fuel Properties on Premixed Charge Compression Ignition Combustion in a Direct Injection Diesel Engine"; SAE Paper 2003-01-1815;JSAE 20030117;2003 JSAE/SAE International Spring Fuels & Lubricants Meeting, Yokohama, Japan; pp. 1-7;May 19-22, 2003.

Gautam Kalghatgi, Per Risberg, Hans-Erik Angstrom; "A Method of Defining Ignition Quality of Fuels in HCCI Engines"; SAE Paper 2003-01-1816; JSAE 20030120; 2003 JSAE/SAE International Spring Fuels & Lubricants Meeting, Yokohama, Japan; pp. 1-11; May 19-22, 2003.

Nicolas Jeuland, Xavier Montagne, Pierre Duret; "Engine and Fuel Related Issues of Gasoline CAI (Controlled Auto-Ignition) Combustion"; SAE Paper 2003-01-1856; JSAE 20030349; 2003 JSAE/SAE International Spring Fuels & Lubricants Meeting, Yokohama, Japan; pp. 1-11; May 19-22, 2003.

Gen Shibata, Koji Oyama, Tomonori Urushihara, Tsuyoshi Nakano; "The Effect of Fuel Properties on Low and High Temperature Heat Release and Resulting Performance of an HCCI Engine"; SAE Technical Paper Series 2004-01-0553; SAE International 2004 SAE World Congress, Detroit, Michigan; pp. 1-13; Mar. 8-11, 2004.

M. Christensen et al.; "Demonstrating the Multi Fuel Capability of Homogeneous Charge Compression Ignition Engine with Variable Compression Ratio;" Annual Index/Abstracts of SAE Technical Papers, Society of Automotive Engineers, Warrendale, PA, US, XP002238451; pp. 1-15; Oct. 25, 1999.

Shigeyuki Tanaka et al.; Two-Stage Ignition in HCCI Combustion and HCCI Control By Fuels and Additives; Combustion and Flame, Elsevier Science Publishing Company, Inc; New York, New York, US; XP-002326337; vol. 132; pp. 219-239; Jan. 1, 2003.

* cited by examiner

METHOD FOR CONTROLLING EXHAUST EMISSIONS FROM DIRECT INJECTION HOMOGENEOUS CHARGE COMPRESSION IGNITION ENGINES

RELATED APPLICATION

This present Application is related to co-pending Provisional Application Ser. No. 60/571,307 filed on May 14, 2004, and takes priority therefrom. The teachings of the related Application are incorporated herein by reference to the extent they do not conflict herewith

BACKGROUND OF THE INVENTION

1. Field of the Invention

The present invention relates to direct injected homogeneous charge compression ignition engines and to a way to exercise control over exhaust emissions, and especially $NO_x$ emissions therefrom by adjusting the characteristics of the fuel.

2. Related Art

In "Effects of Fuel Properties on Premixed Charge Compression Ignition Combustion in a Direct Injection Diesel Engine," Kitano et al SAE 2003-01-1815, it is taught that $NO_x$ emissions among three test fuels, two based on fuels having a boiling range of about 35° C. to 139° C. and of 25, 40 cetane, and one diesel of boiling range 170° C. to 355° C., and of 53 cetane number, respectively, showed a tendency to decrease as the cetane number is lowered and as the injection timing is advanced.

In "A Method of Defining Ignition Quality of Fuels in HCCI Engines," Kalghatgi et al. SAE 2003-01-1816, it is taught that more sensitive fuels are likely to be better than less sensitive fuels of the same RON for HCCI engines. Fuel sensitivity is reported to increase as the aromatic/olefinic/oxygenate content of the fuel increases.

Homogeneous charge compression ignition (HCCI) is a rapidly evolving technology that offers great potential for meeting future exhaust emissions regulations while maintaining good fuel conversion efficiency.

The primary reason HCCI systems are being developed is because of their ultra-low $NO_x$ and particulate matter emissions capability that will be needed to meet future worldwide emissions regulations, excellent fuel efficiency and the possible avoidance of costly aftertreatment systems.

HCCI systems will likely target the US on-highway 2010 and off-road Tier 4b regulations due to the extremely low $NO_x$ emissions levels, although forms of HCCI could be used to meet practically all upcoming regulations. $NO_x$ levels of 0.2–0.3 g/HP·h translate into <50 ppm $NO_x$ at all engine operating conditions (<10 ppm at most), and the only other known methods to achieve these levels involve the use of expensive $NO_x$ aftertreatment technology such as $NO_x$ adsorbers and SCR systems. If a true homogeneous mixture is achieved, rich regions in the cylinder are avoided and solid carbon levels are effectively zero, avoiding the need for particulate traps. Hydrocarbon and CO levels are also legislated and HCCI combustion has inherently high levels of these emissions, especially at light loads (low equivalence ratios). So even if HCCI combustion methods are successful at eliminating the need for $NO_x$ and PM traps, oxidation catalysts will still be needed.

The primary challenge of most HCCI development activities is achieving these ultra low $NO_x$ and PM emissions over the entire power spectrum and legislated emissions cycles the engines must operate within. For certain applications such as passenger cars and light trucks, in some countries the emissions cycles only subject the vehicle to part load operation so an HCCI strategy that achieves low emissions up to ½ load and then uses more conventional methods at higher loads may be a perfectly acceptable solution. However, for on-highway trucks and off-road machines, the emissions cycles are such that the engines must produce ultra-low $NO_x$ and PM levels from light load up to full load. Therefore, the ideal HCCI solution is one which works at all engine operating conditions and this has proven to be the most difficult obstacle to overcome by most researchers involved in HCCI development. The primary reason for this is the rapid increase in the rate of combustion as more fuel is injected to increase the power output of the engine. These high combustion rates can lead to cylinder pressures exceeding the structural limits of engine cylinder components (piston, rings, head, etc.) and often are accompanied by high $NO_x$ emissions and increased heat loss.

HCCI engines have higher HC and CO emissions than standard diesel engines so control of these emissions is also important.

It would be desirable, therefore, to identify techniques for the control and reduction of $NO_x$, particulate matter and other exhaust emissions which could be implemented independently of mechanical or operational control of the HCCI engine while extending the size of the fuel pool.

SUMMARY OF THE INVENTION

It has been discovered that the exhaust emissions, especially the $NO_x$ emissions from a direct injected HCCI engine can be controlled and held at a low level by combusting in the HCCI engine a fuel of reduced cetane number, fuels having a cetane number of between about 20–50, preferably between about 20–40, and more preferably between about 20 to 30. The total aromatic content of the fuel can be greater than 15 wt %, preferably greater than 28 wt %, and more preferably between 28 to 50 wt %. Fuel boiling range can be from 25° C. to 380° C. For gasoline fuels the average of research and motor octane numbers, (R+M)/2, can be 60 to 91, preferably 60 to 81, and more preferably 60 to 70.

DESCRIPTION OF THE FIGURES

Various embodiments of the present invention are described with reference to the figures, wherein.

DESCRIPTION OF THE INVENTION

Figure 1:
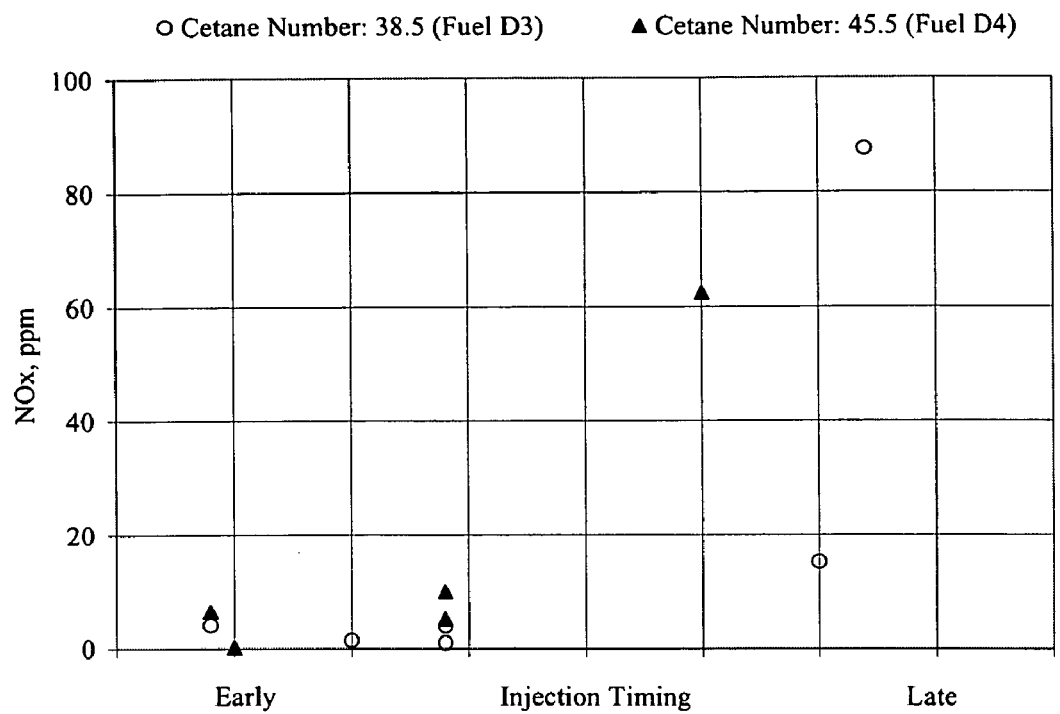
FIGS. 1–5 show the effect of injection timing and cetane number (38.5–45.5 range) on $NO_x$, AVL smoke number, HC, CO and thermal efficiency, respectively, at 1500 rpm, 50% load.
Figure 2:
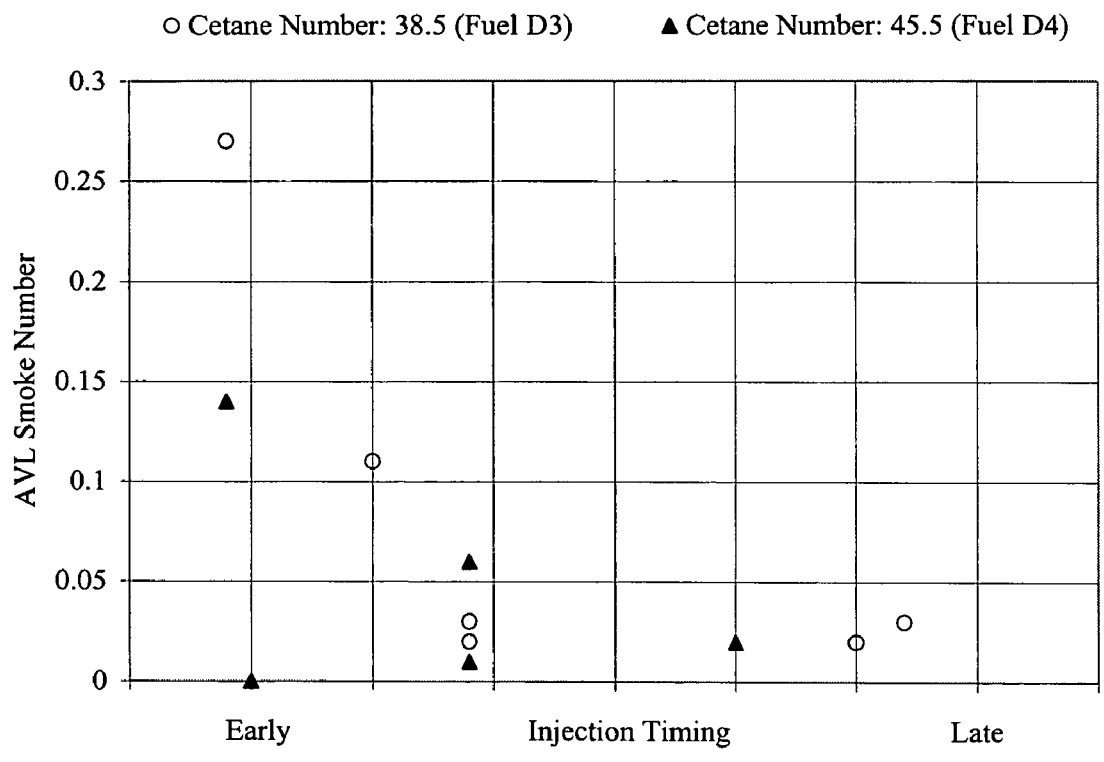
Figure 3:
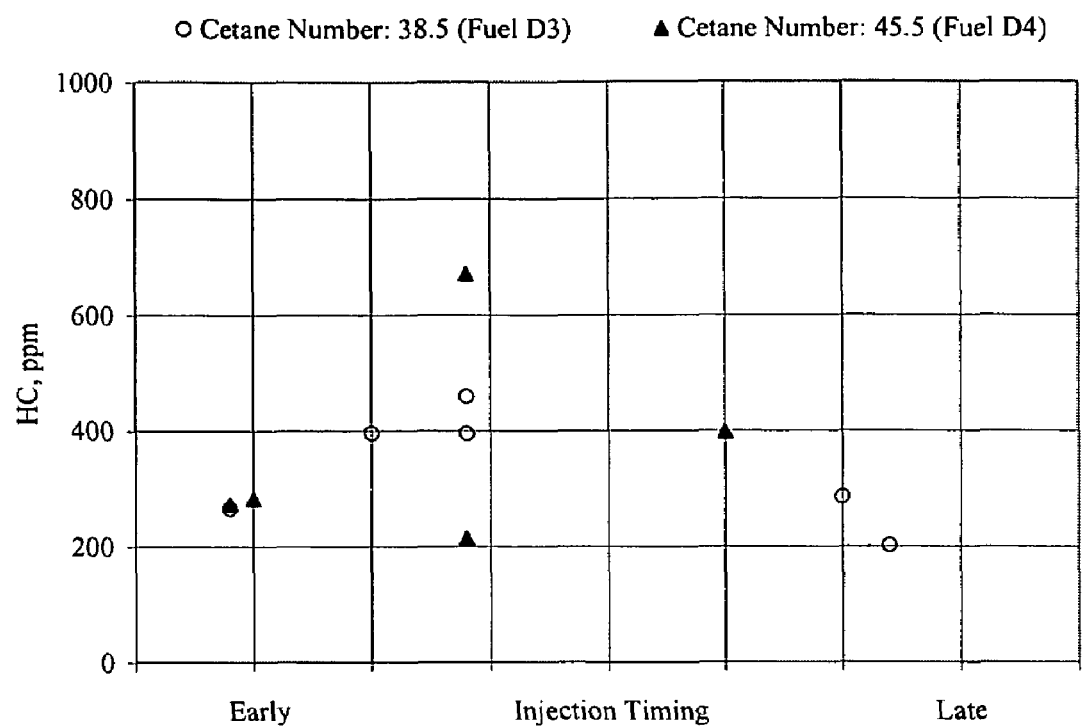
Figure 4:
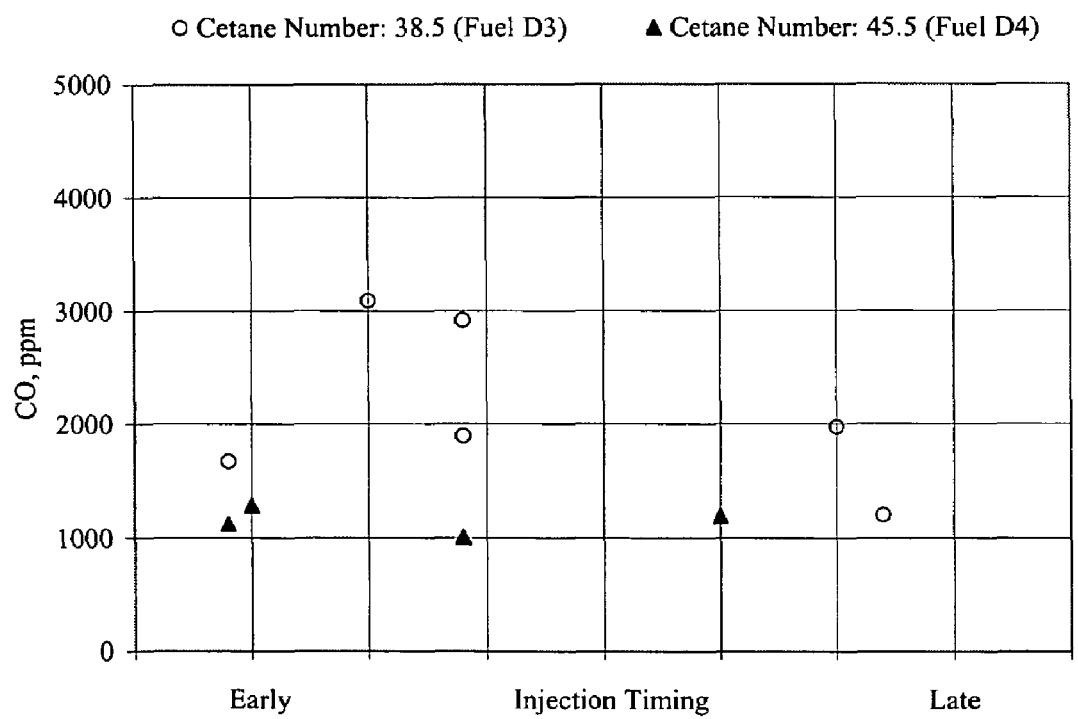
Figure 5:
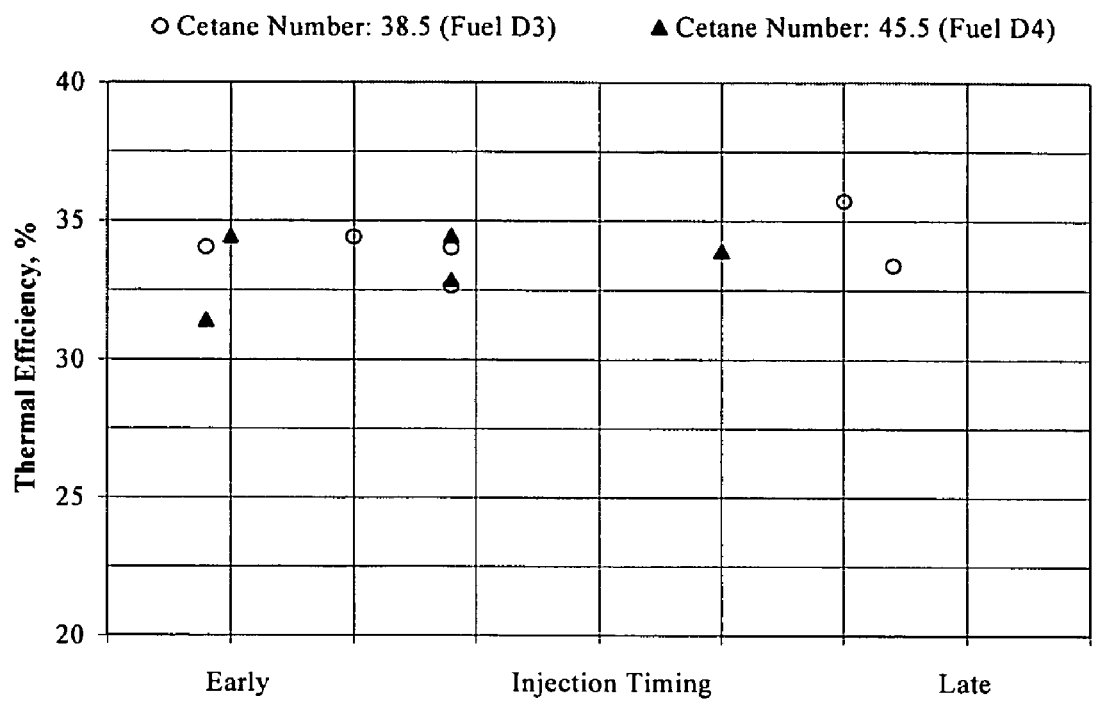
Figure 6:
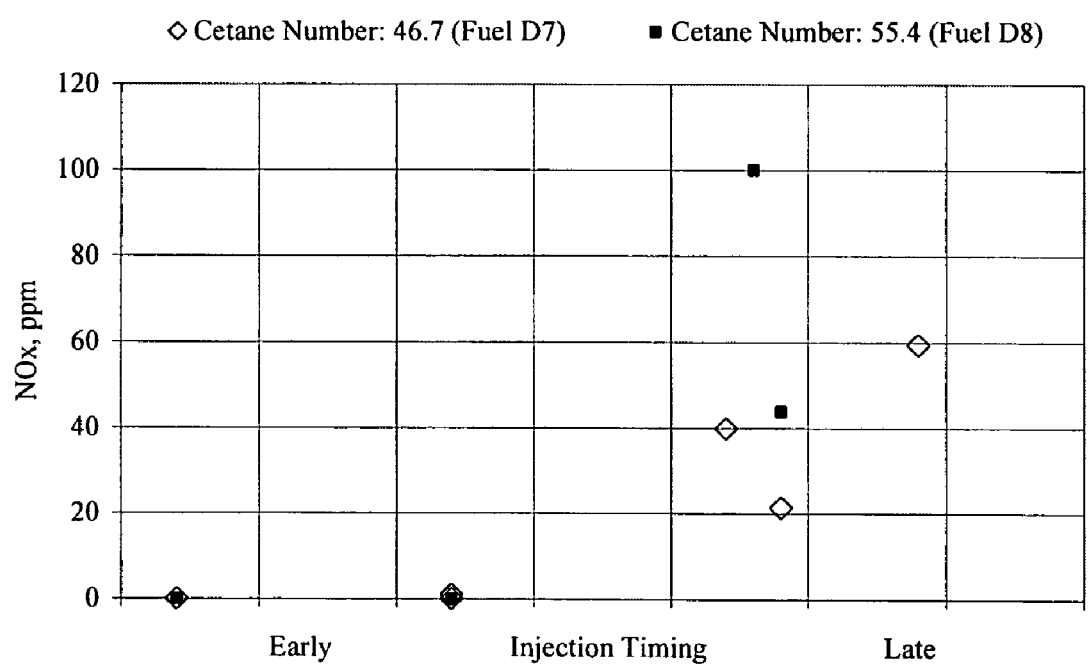
FIGS. 6–10 show the effect of injection timing and cetane number (46.7–55.4 range) on $NO_x$, AVL smoke number, HC, CO and thermal efficiency, respectively, at 1200 rpm, 25% load.
Figure 7:
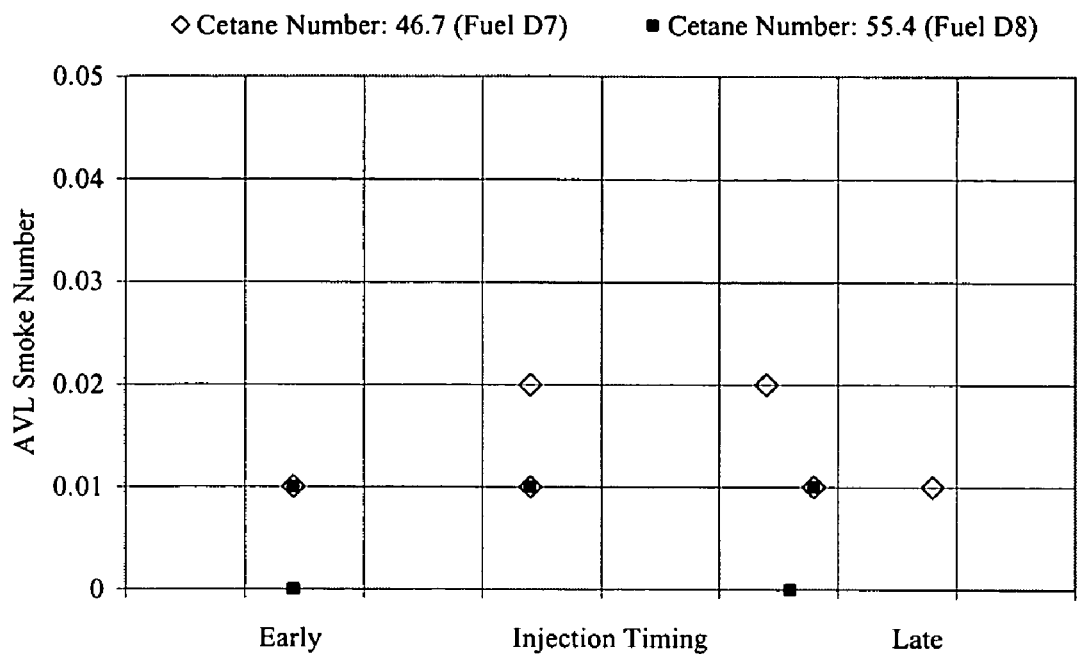
Figure 8:
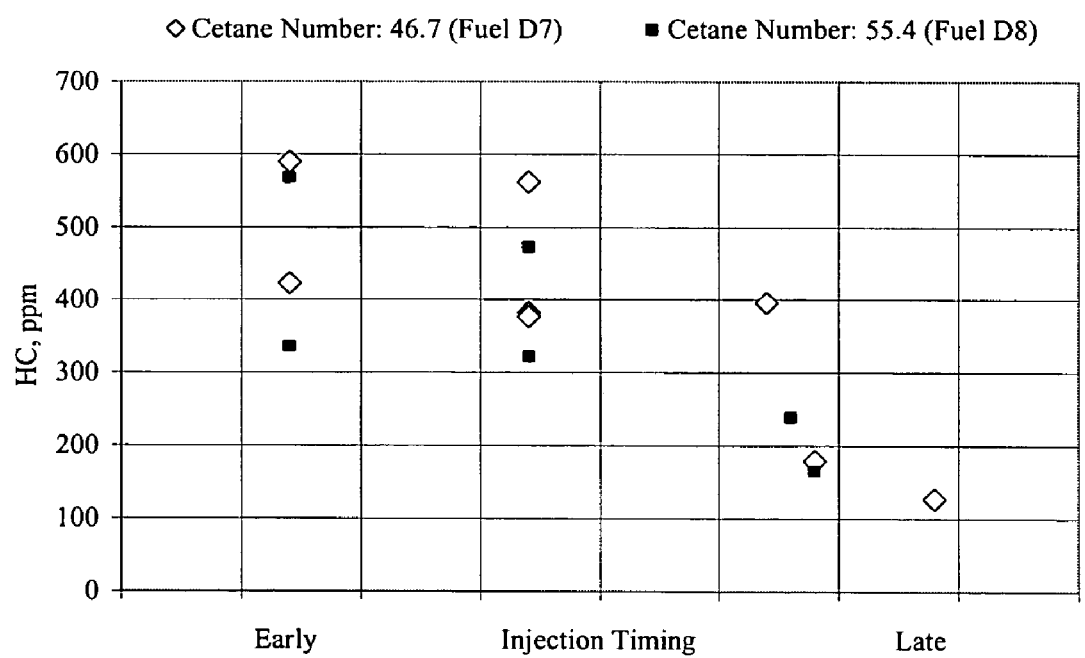
Figure 9:
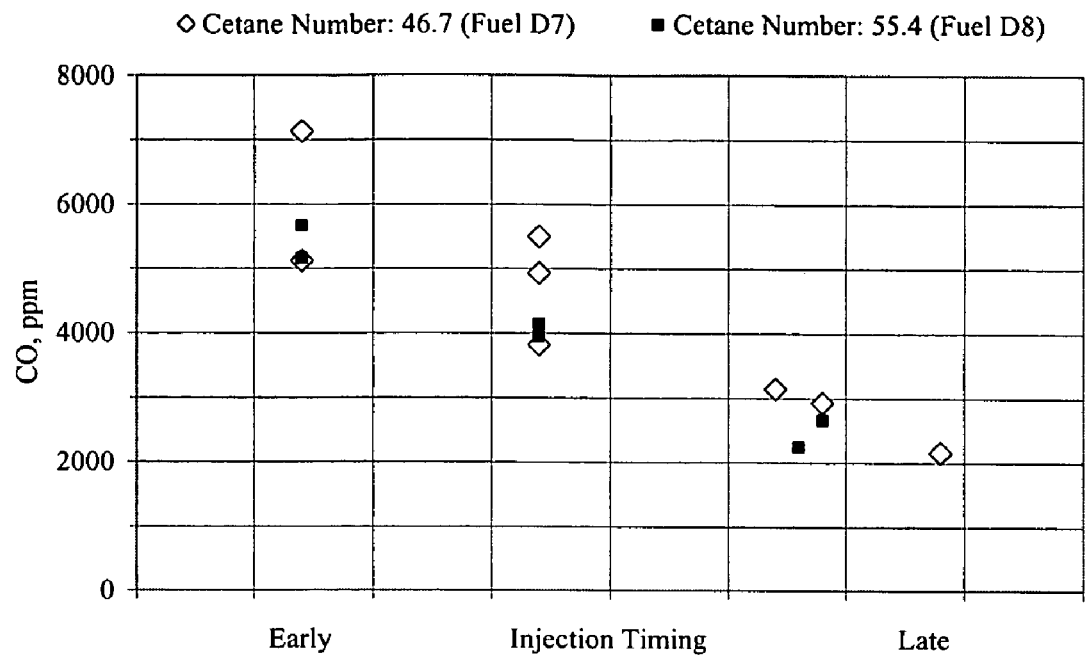
Figure 10:
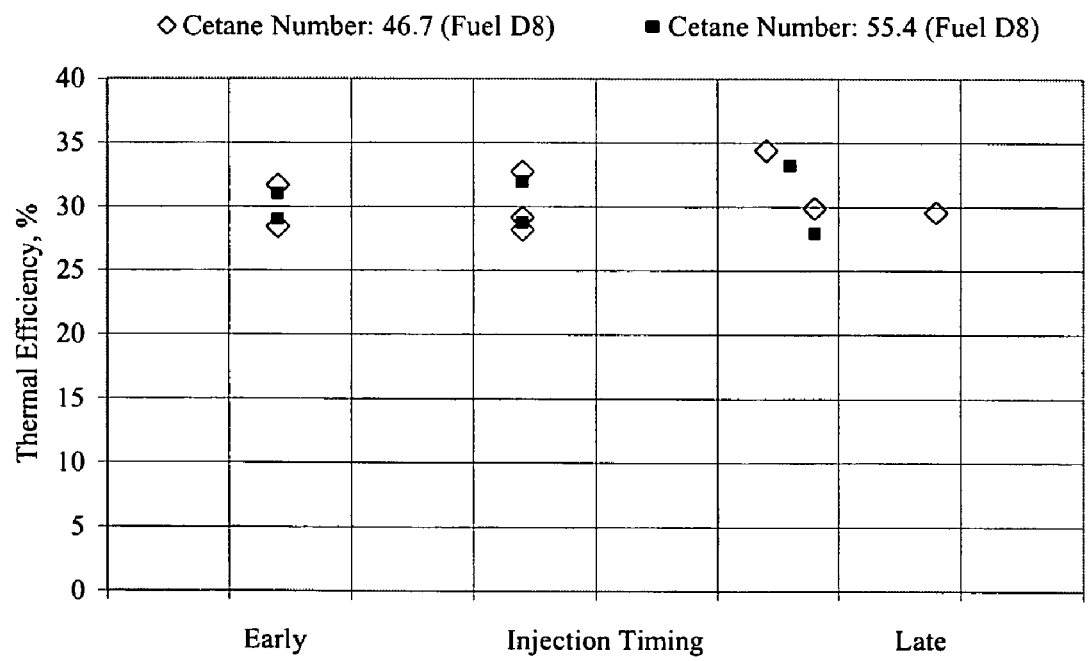

The exhaust emissions, and especially the $NO_x$ emissions, from a direct injected homogeneous charge compression ignition engine can be controlled and held at a low level or reduced by combusting in the direct injected HCCI engine in which fuel is injected during the compression stroke, a fuel having a cetane number or derived cetane number as determined by ASTM D613 or ASTM D6890, respectively, of between about 20–50, preferably about 20–40, and more preferably about 20–30, with the fuel also having a total aromatics content of about 15 wt % or more, preferably 28 wt % or more, more preferably between about 15 to 50 wt %, and most preferably between about 28 to 50 wt %. Fuel boiling range can be from 25° C. to 380° C. For gasoline fuels the average of research and motor octane numbers, ((R+M)/2), can be 60 to 91, preferably 60 to 81, and more preferably 60 to 70.

Diesel fuel is defined as a mixture of hydrocarbons which boil at atmospheric pressure over a temperature range within about 150° C. to 380° C., whereas gasoline fuels are those which boil at atmospheric pressure over a temperature range within about 25° C. to 220° C.

The fuels used can also contain non-hydrocarbon components, such as oxygenates. They can also contain additives, e.g., dyes, antioxidants, cetane improvers, cold flow improvers, or lubricity improvers.

Experimental

A study was conducted to explore fuel property effects on HCCI engine performance and exhaust emissions, focusing on cetane number, aromatic content and volatility for all fuels, and octane number for gasoline fuels. The properties of diesel fuels used in this study are shown in Table 1. The properties of gasoline test fuels are presented in Table 2.

TABLE 1

Properties of Diesel Test Fuels

| PARAMETER | | Test Method | FUEL | | | | | |
|---|---|---|---|---|---|---|---|---|
| | | | D0 | D1* | D2 | D3 | D4 | D5 |
| Density, g/cm3 | | ASTM D4052 | 0.8502 | 0.8674 | 0.9109 | 0.8673 | 0.8503 | 0.8138 |
| Cetane Number | | ASTM D613 | 44.7 | 45.9 | 31.7 | 38.5 | 45.5 | 46.2 |
| Distillation, F | IBE | ASTM D86 | 317 | 349 | 482 | 349 | 368 | 359 |
| | 5% | | 371 | 396 | 498 | 396 | 403 | 374 |
| | 10% | | 399 | 415 | 500 | 415 | 411 | 375 |
| | 20% | | 441 | 439 | 506 | 439 | 425 | 381 |
| | 30% | | 474 | 462 | 512 | 462 | 442 | 387 |
| | 40% | | 499 | 485 | 518 | 485 | 458 | 400 |
| | 50% | | 520 | 507 | 527 | 507 | 481 | 430 |
| | 60% | | 539 | 531 | 536 | 531 | 503 | 540 |
| | 70% | | 559 | 555 | 549 | 555 | 537 | 604 |
| | 80% | | 584 | 586 | 567 | 586 | 579 | 613 |
| | 90% | | 618 | 625 | 597 | 625 | 615 | 622 |
| | 95% | | 647 | 655 | 627 | 655 | 635 | 632 |
| | EP | | 662 | 671 | 630 | 671 | 649 | 641 |
| SFC Aromatics, wt % | 1-ring | ASTM D5186 | — | 28.6 | 37.5 | 28.6 | 29.3 | 27.4 |
| | 2+ -ring | | — | 14.8 | 9.2 | 14.8 | 15.4 | 3.1 |
| | Total | | 28.0 | 43.4 | 46.7 | 43.4 | 44.7 | 30.5 |

*Fuel D3 treated with 0.3 vol % of ethylhexyl nitrate cetane improver
**Fuel D9 treated with 0.15 vol % of ethylhexyl nitrate cetane improver
***Fuel D9 treated with 0.4 vol % of ethylhexyl nitrate cetane improver

TABLE 2

Properties of Gasoline Test Fuels

| PARAMETER | | Test Method | FUEL | | |
|---|---|---|---|---|---|
| | | | G1 | G2 | G3 |
| Density, g/cm3 | | ASTM D4052 | 0.7286 | 0.7266 | 0.7239 |
| RON | | ASTM D2699 | 95.2 | 83.6 | 65.0 |
| MON | | ASTM D2700 | 87.1 | 78.9 | 61.4 |
| (R + M)/2 | | — | 91.2 | 81.2 | 63.2 |
| Derived Cetane Number | | ASTM D6890 | 20.4 | 26.7 | 31.2 |
| Distillation, F | IBE | ASTM D86 | 93.4 | 97.7 | 99.0 |
| | 5% | | 127.6 | 129.0 | 127.6 |
| | 10% | | 140.5 | 141.6 | 138.4 |
| | 20% | | 158.5 | 158.5 | 152.1 |
| | 30% | | 176.5 | 174.7 | 166.5 |
| | 40% | | 195.4 | 190.4 | 181.9 |
| | 50% | | 212.2 | 205.5 | 199.6 |
| | 60% | | 224.6 | 218.8 | 222.1 |
| | 70% | | 236.5 | 234.5 | 248.4 |
| | 80% | | 253.9 | 260.2 | 277.3 |
| | 90% | | 298.6 | 308.7 | 315.3 |

TABLE 2-continued

Properties of Gasoline Test Fuels

| PARAMETER | | Test Method | FUEL | | |
|---|---|---|---|---|---|
| | | | G1 | G2 | G3 |
| | 95% | | 342.9 | 337.8 | 339.1 |
| | EP | | 385.9 | 380.5 | 372.6 |
| PIONA, wt % | Saturates | ASTM D6839 | 65.4 | 65.4 | 82.6 |
| | Olefins | | 8.0 | 8.3 | 2.1 |
| | Aromatics | | 26.7 | 26.3 | 15.3 |

The engine used in this study was a single cylinder Caterpillar 3401 engine with specifications given in Table 3. A hydraulically intensified fuel injector was used to provide a uniform spray distribution.

TABLE 3

Engine Specification

| Displacement | 2.44 dm³ |
|---|---|
| Bore/Stroke | 137.2/165.1 mm |
| Valves per cylinder | 4 |
| Swirl Ratio | ~0.4 |

Intake and exhaust surge tanks were used to provide boost and backpressure levels that are representative of actual multi-cylinder turbocharger operation. No oxidation catalyst was used so the HC and CO levels reported are all engine-out values. Exhaust gas emissions of CO, HC, $NO_x$ and $CO_2$ were measured with a Horiba EXSA analyzer. An AVL smoke meter was used for smoke measurement.

The fuels were tested at engine speeds of 1200, 1500 and 1800 rpm and engine loads of 25%, 50% and 70+%.

The study was focused on engine operating conditions characterized by $NO_x$ emissions <0.2 g/HP·h and AVL smoke numbers <0.1. The former corresponds to US EPA 2010 $NO_x$ emission standard for heavy-duty engines, while the latter is roughly equivalent to the 2010 particulate emission requirement of 0.01 g/HP·h.

The effect of cetane number on the performance and emissions of the HCCI engine was evaluated by comparing low cetane (38.5) diesel fuel D3 with mid-range cetane (45.5) fuel D4, as well as mid-range cetane number (46.7) diesel fuel D7 with high cetane (55.4) diesel fuel D8. The fuels in each pair had very similar distillation properties and aromatic content.

The effect of cetane number increase achieved through changes in the hydrocarbon composition of the fuel (natural cetane number) was also compared to cetane number enhancement achieved through the use of ethylhexyl nitrate ignition improver. This comparison involved testing of natural cetane fuels D3 and D4 alongside the cetane enhanced fuel D1 (prepared by treating fuel D3 with the ignition improver). The cetane number of fuel D1 (45.9) was matched to that of fuel D4 (45.5), along with aromatic content and distillation properties. In addition, diesel fuel D2 whose cetane number was 31.7, and three gasolines, G1, G2 and G3, whose derived cetane numbers equaled 20.4, 26.7 and 31.2, respectively, were tested to determine the effect of further reduction in cetane number on the operating range of the engine. Fuels G1, G2 and G3 also allowed the effect of octane number to be evaluated.

The effect of aromatic content was investigated using fuels D4 and D7 which contained 44.7 and 28.7 wt % of aromatics, respectively.

Volatility effects were investigated by comparing middle distillate fuels D6 and D7. Fuel D6 was more volatile than fuel D7, as its distillation range was lower, e.g. the 90% distillation temperatures of these fuels equaled 257° C. and 313° C., respectively. Fuel D7 had the volatility of No. 2 diesel fuel, while Fuel D6 had the volatility of No. 1 diesel fuel or kerosene. Volatility effects were also determined by comparing results for diesel and gasoline fuels.

FIGS. 1 through 5 show $NO_x$, AVL smoke, HC, CO and thermal efficiency of the test engine operated on fuels D3 and D4 whose cetane numbers were 38.5 and 45.5, respectively. The same parameters are plotted in FIGS. 6 through 10 for fuels D7 and D8 whose cetane numbers were 46.7 and 55.4, respectively. In each case, cetane effects are shown for a single speed/load condition but they did not vary significantly over the conditions tested. $NO_x$ emissions increased as fuel injection timing was retarded, while smoke, HC and CO emissions were reduced or remained unchanged.

At early (advanced) injection timings, the $NO_x$ emissions are very low since ample time for fuel to vaporize and mix with air leads to relatively homogeneous distribution of fuel within the combustion chamber at low combustion temperatures. For the late (retarded) combustion timings, fuel distribution within combustion chamber becomes less homogeneous leading to higher local combustion temperatures and increased $NO_x$ emissions, but reduced HC, CO and smoke. An intermediate injection timing region is used where low $NO_x$ and smoke can be realized with moderate levels of HC and CO.

Thermal efficiency tended to improve with retarded injection timing, in line with lower HC and CO emissions. Overall, the effects of differences in cetane number on engine performance and emissions were small and tended to disappear as injection timing was retarded at all engine operating conditions used in this study. Where its effect was detectable, cetane number increase seemed to improve CO, HC and smoke emissions at advanced fuel injection settings compared against low cetane number fuel. These small effects of cetane number which were observed may be attributed to increased fuel reactivity and advanced start of combustion timing associated with increased cetane number of the fuel.

While the higher cetane number fuel appeared to improve CO, HC and smoke emissions at advanced fuel injection settings as compared against lower cetane number fuel, the lower cetane number fuel appeared to hold $NO_x$ reduction to the same low level or to improve it beyond that demonstrated with the high cetane number fuel over the injection setting range investigated (see FIGS. 1–10 and Table 4).

Figure 11:
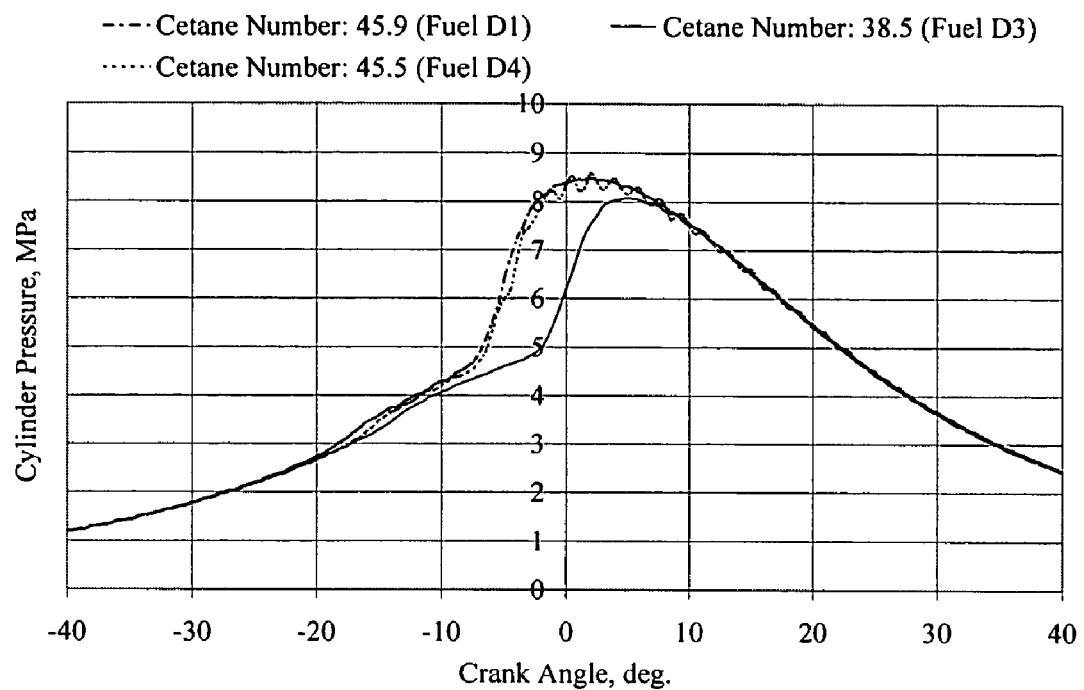
FIGS. 11 and 12 show the effect of natural and enhanced cetane number on cylinder pressure and heat release rate, respectively, at 1200 rpm, 25% load.
Figure 12:
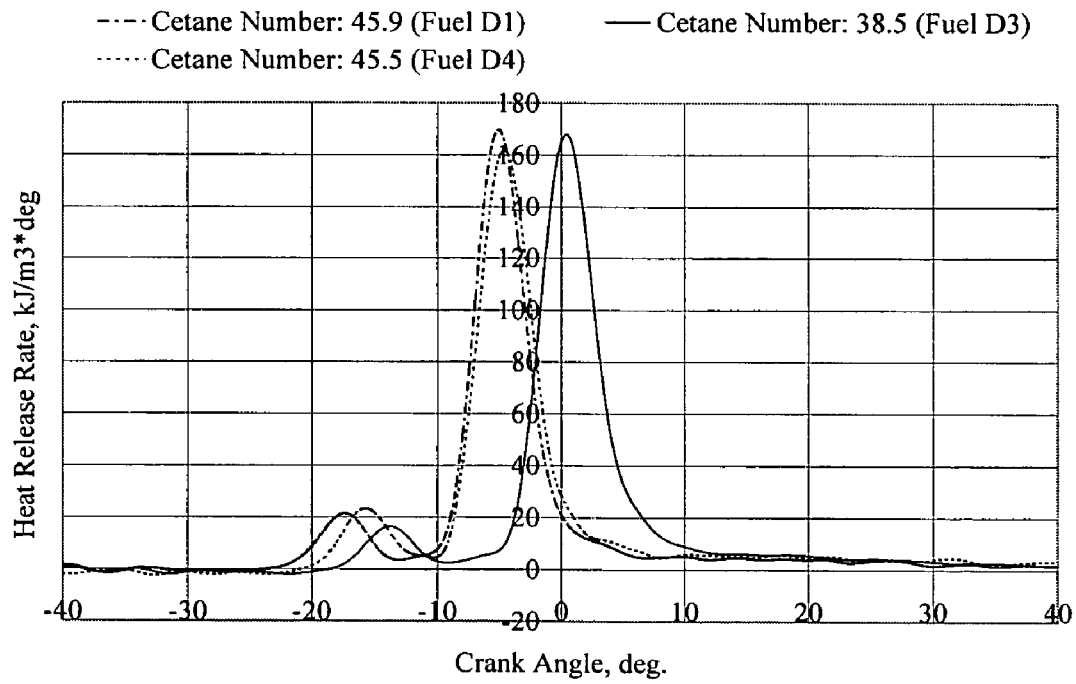
Figure 13:
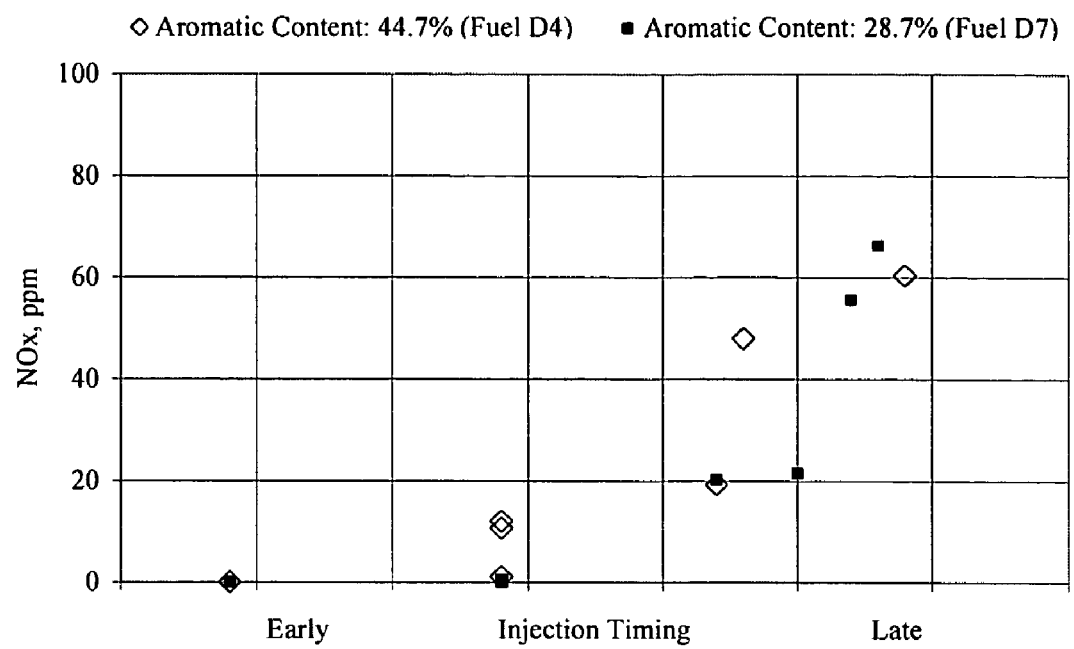
FIGS. 13–17 show the effect of injection timing and aromatic content on $NO_x$, AVL smoke number, HC, CO and thermal efficiency, respectively, at 1500 rpm, 25% load.
Figure 14:
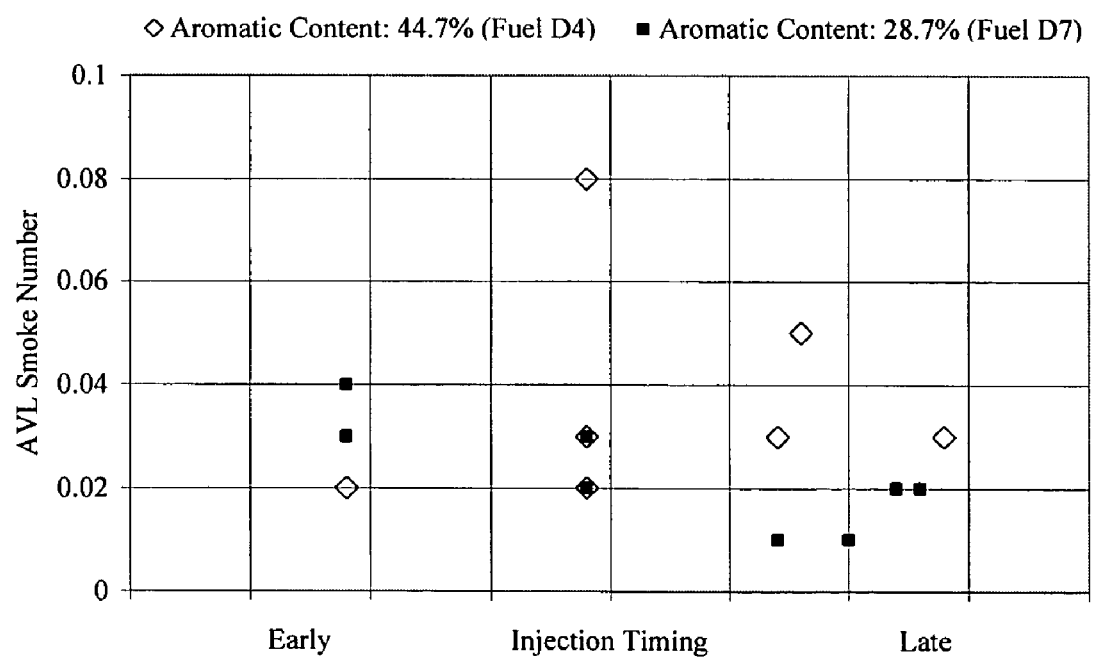
Figure 15:
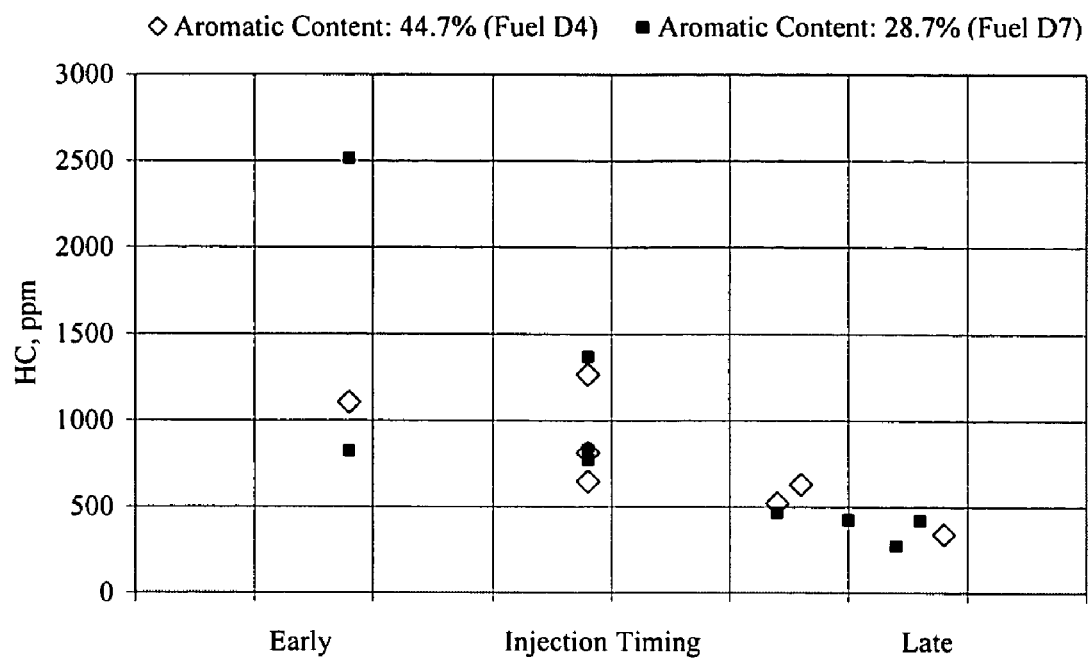
Figure 16:
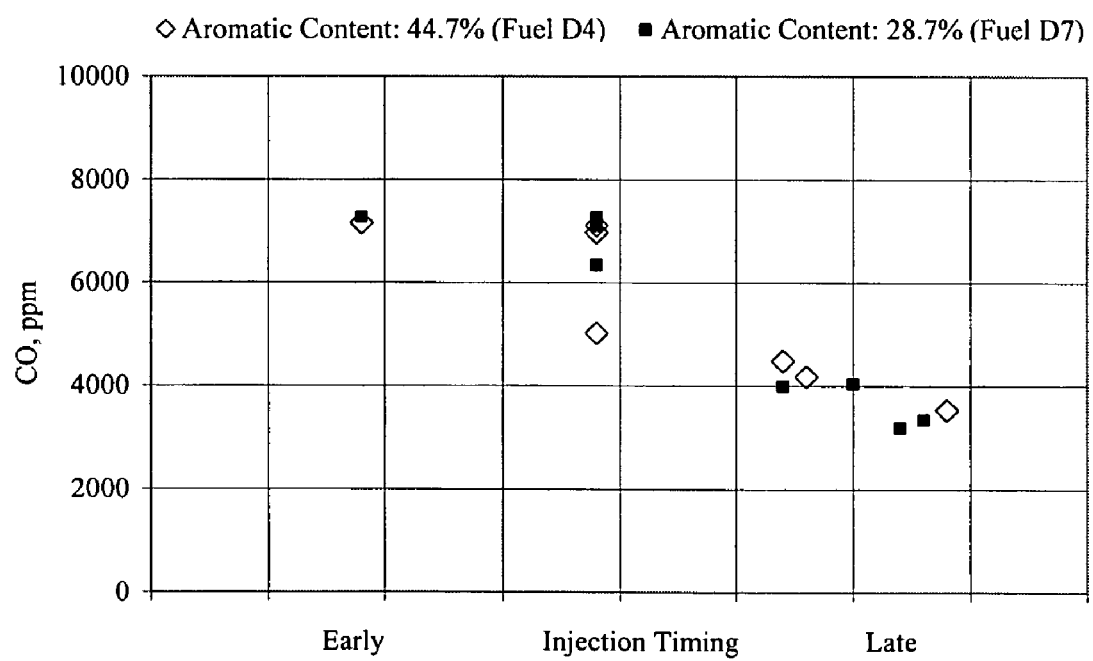
Figure 17:
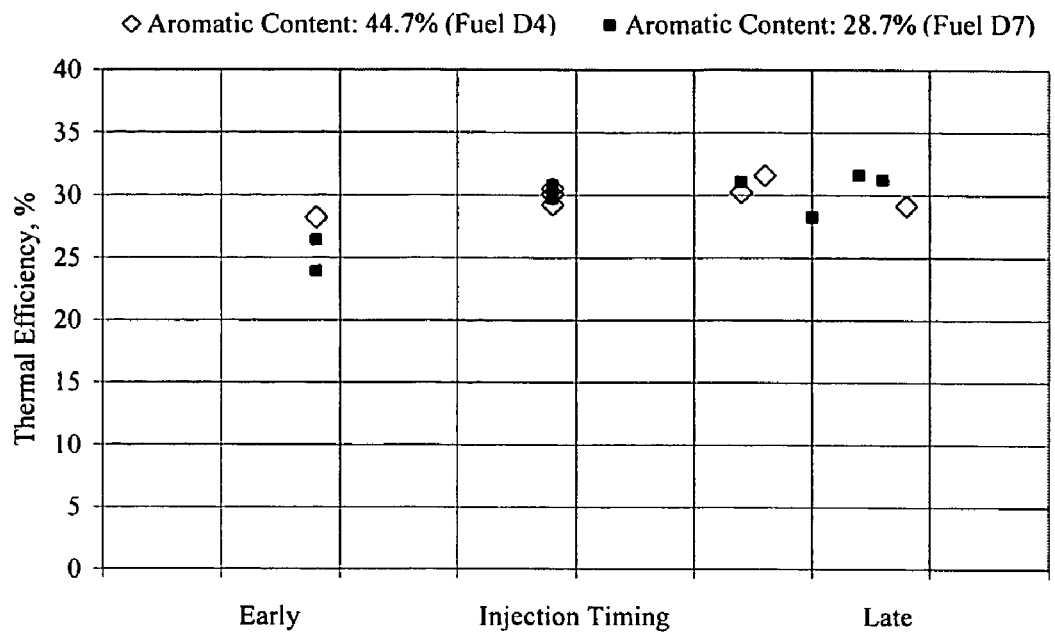

The effects of natural and enhanced cetane number are compared in Table 4 which contains results of engine tests performed at 1200 rpm, 25% load. These results demonstrate roughly equivalent effect of the 45.5 cetane unadditized fuel D4 and the 45.9 cetane ignition enhanced fuel D1 on NOx, AVL smoke number, HC, CO and thermal efficiency of the HCCI engine relative to the 38.5 cetane base fuel D3. As shown in FIGS. 11 and 12, fuels D1 and D4 also advanced the start of combustion timing by about 6 degrees crank angle relative to fuel D3. This effect of cetane number on SOC timing is not desirable in HCCI engines. In fact, it is counterproductive from the point of achieving higher load operation on HCCI engines. Increasing cetane number makes it more difficult to achieve optimum combustion phasing at high loads and maximize thermal efficiency of the engine within the constraints of the cylinder pressure and rate of pressure rise limits.

TABLE 4
Effects of Natural and Enhanced Cetane Number

| Parameter | Unit | Fuel D1 | Fuel D3 | Fuel D4 |
|---|---|---|---|---|
| NOx | ppm | 40 | 12 | 35 |
| AVL Smoke | Smoke Number | 0.08 | 0.02 | 0.08 |
| HC | ppm | 556 | 792 | 536 |
| CO | ppm | 1955 | 3065 | 2110 |
| Thermal Efficiency | % | 32.6 | 34.3 | 32.2 |

As shown in Tables 5 and 6, diesel fuel D2 and gasoline G3 allowed the HCCI engine to operate over the broadest speed and load ranges. Fuel D2 enabled engine operation at 72% at 1200 rpm, and 78% at 1800 rpm. Fuel G3 enabled operation at 75% load at 1200 rpm, and 83% load at 1800 rpm. The cetane number of fuel D2 and the derived cetane number of fuel G3 were 31.7 and 31.2, respectively. On the other hand, gasolines G1 and G2 proved to be excessively resistant to autoignition and severely restricted the operating range of the engine. Fuel G2 (derived cetane number of 26.7) allowed the engine to achieve 75% load at 1200 rpm, but limited its operation at 1800 rpm to a single load of 71%. At 1200 rpm, engine operation on fuel G1 (derived cetane number of 20.4) was limited to the narrow load range of 50 to 75%. At 1800 rpm, HCCI combustion was not achieved on this fuel.

The testing results also show that engine operating range increases as fuel octane number is reduced. Fuel G3 with (R+M)/2 octane number of 63.2 provided a larger operating range than G2, with R+M/2 of 81.2, which in turn provided a larger operating range than G1 with R+M/2 of 91.2. Octane number is a measure of ignition resistance for gasoline fuels. Unlike a standard gasoline engine, HCCI engines do not have a spark plug to initiate ignite the fuel. If the ignition resistance of the fuel is too high then the fuel is too difficult to ignite and engine operation is restricted.

TABLE 5
Load Range of the HCCI Engine Operated on Fuel D2

|  | 1200 rpm | 1800 rpm |
|---|---|---|
| Maximum Load Achieved, % | 72% | 78% |
| Minimum Load Achieved, % | 10% | 15% |

TABLE 6
Load Ranges of the HCCI Engine Operated on Fuels G1, G2 and G3

|  | Fuel G1 | | Fuel G2 | | Fuel G3 | |
|---|---|---|---|---|---|---|
|  | 1200 rpm | 1800 rpm | 1200 rpm | 1800 rpm | 1200 rpm | 1800 rpm |
| Maximum Load Achieved, % | 75 | HCCI operation was not achieved at any engine load | 75 | 71 | 75 | 83 |
| Minimum Load Achieved, % | 50 However, engine operation was unstable |  | 50 HCCI operation at <50% load was not attempted | HCCI operation was not possible at any other load | 25 HCCI operation at <25% load was not attempted | 25 HCCI operation at <25% load was not attempted |

The effect of aromatic content of the fuel on exhaust emissions and thermal efficiency is shown in FIGS. 13 through 17 for the 1500 rpm, 25% load operating point. The comparison is based on fuels D4 and D7 whose total aromatic content equaled 44.7 and 28.7 wt %, respectively. In general, the observed effects were small and followed no clear trends for the engine operating conditions used in this study. These results suggest that this HCCI combustion system could be relatively insensitive to the aromatics content of diesel fuel.

HCCI combustion systems seem to be relatively insensitive to the aromatics content of diesel fuel, whereas conventional diesel combustion systems are sensitive to this parameter.

This insensitivity to aromatics along with the ability to run well and with low $NO_x$ emissions using lower cetane number diesel fuel could significantly increase the size of the pool of useable diesel fuel.

Figure 18:
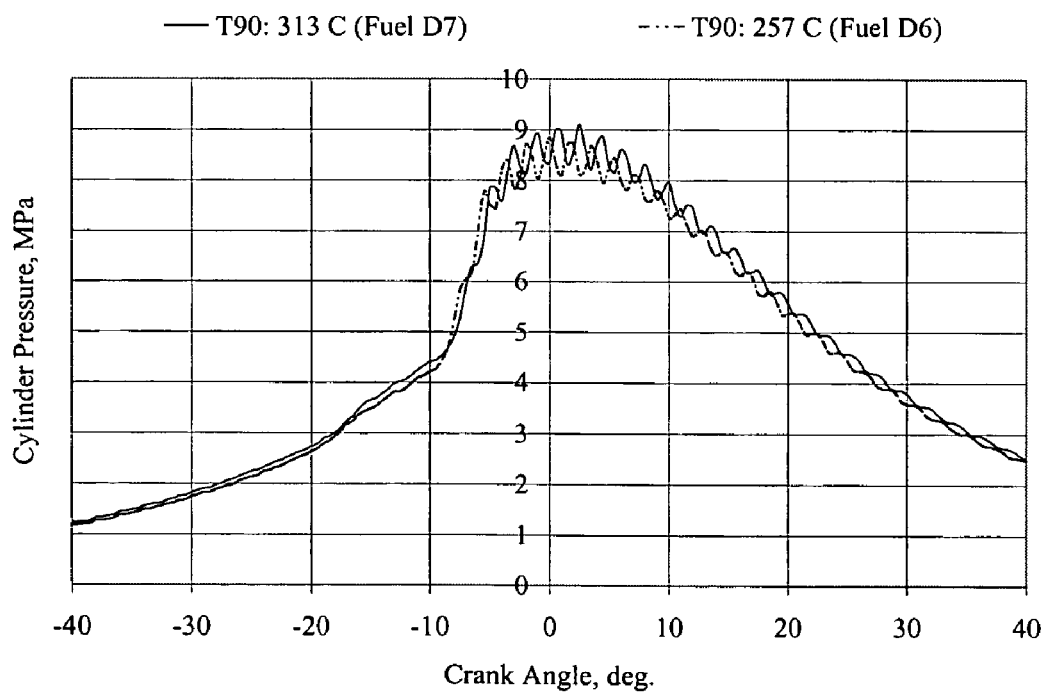
FIGS. 18–19 show the effect of fuel volatility on engine heat release and cylinder pressure, respectively, at 1200 rpm, 25% load.
Figure 19:
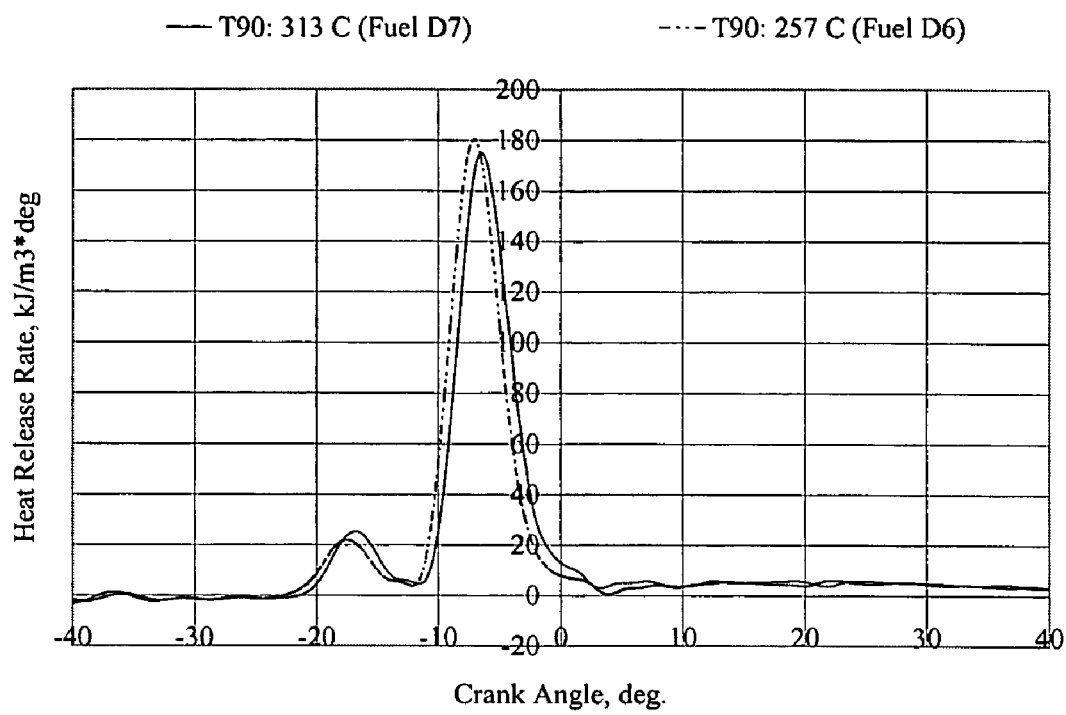
Figure 20:
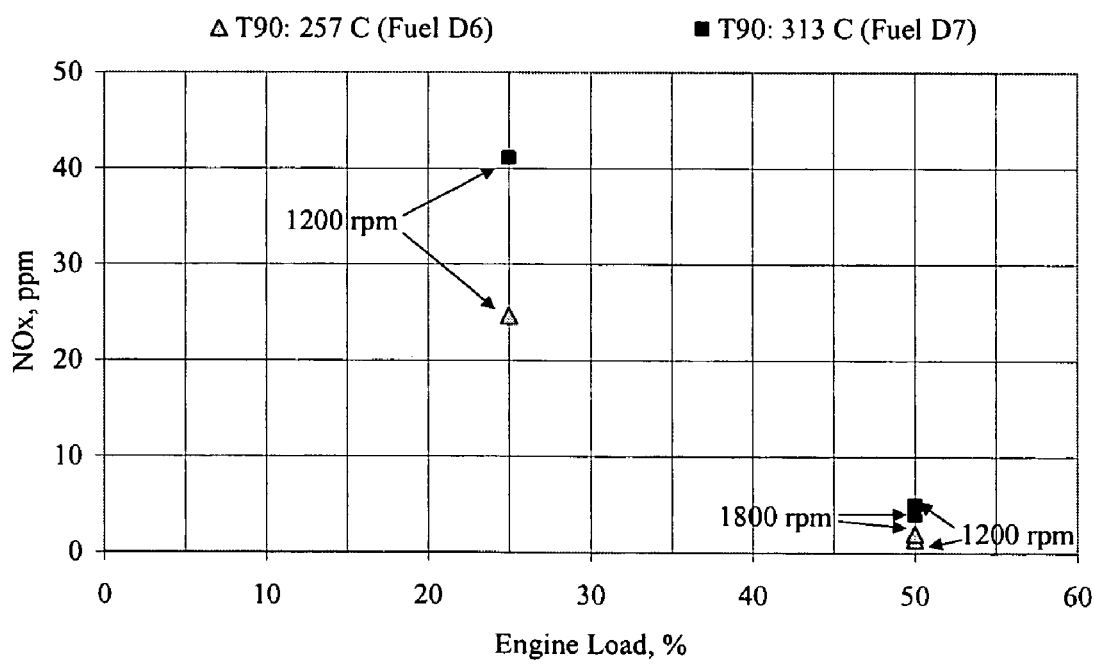
FIGS. 20–24 show the effect of fuel volatility on NOx, AVL smoke number, HC, CO, and thermal efficiency, respectively, at 1200 rpm and 1800 rpm.
Figure 21:
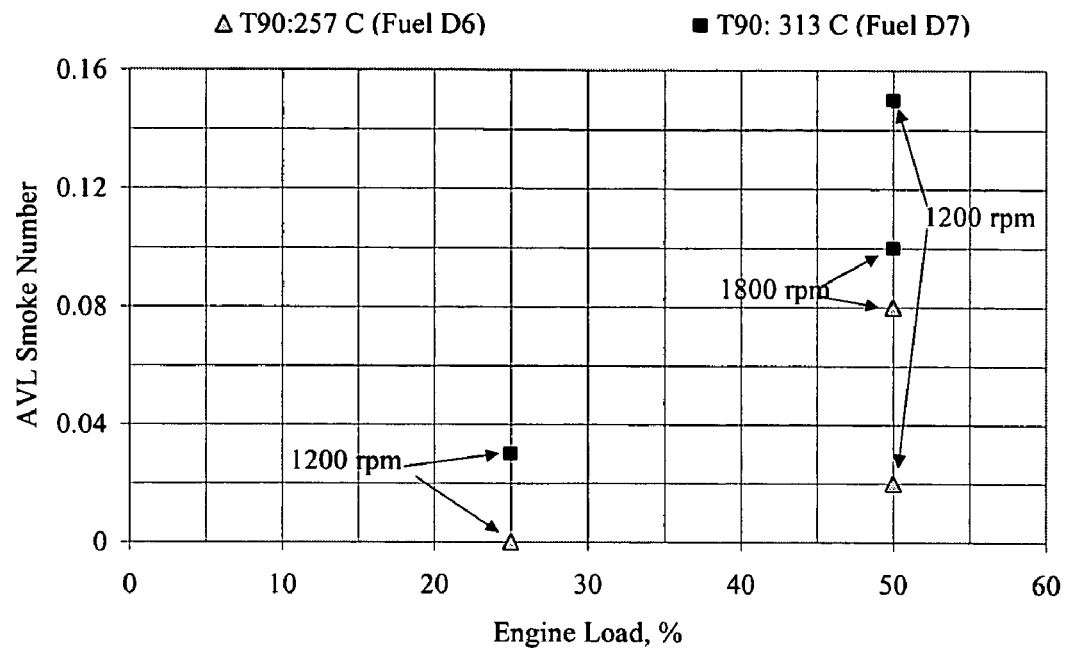
Figure 22:
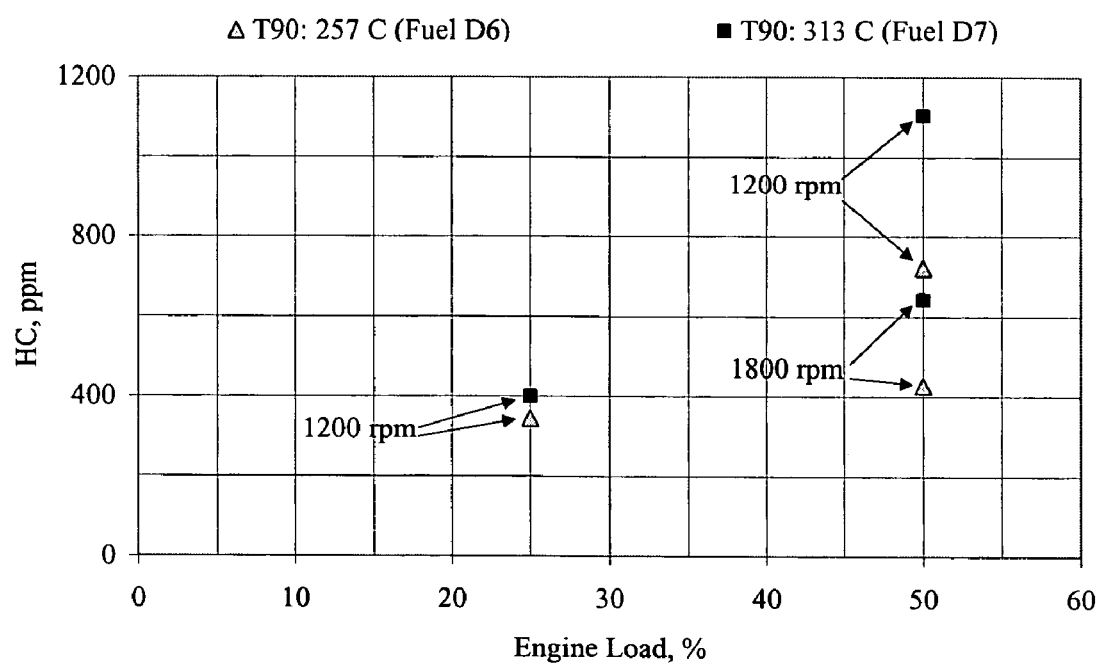
Figure 23:
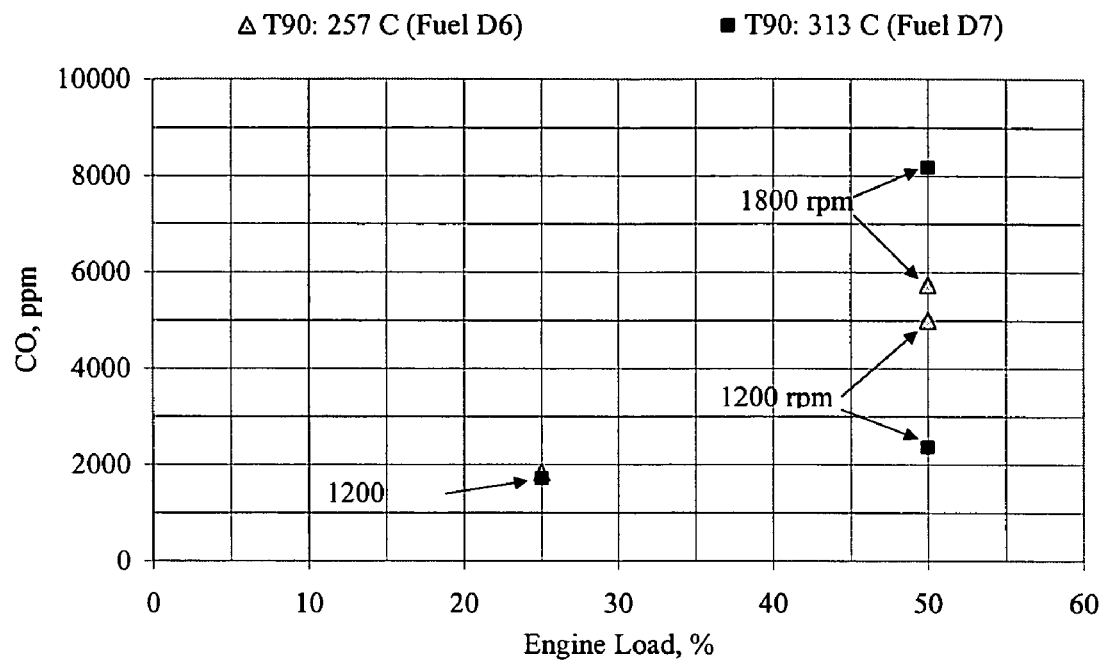
Figure 24:
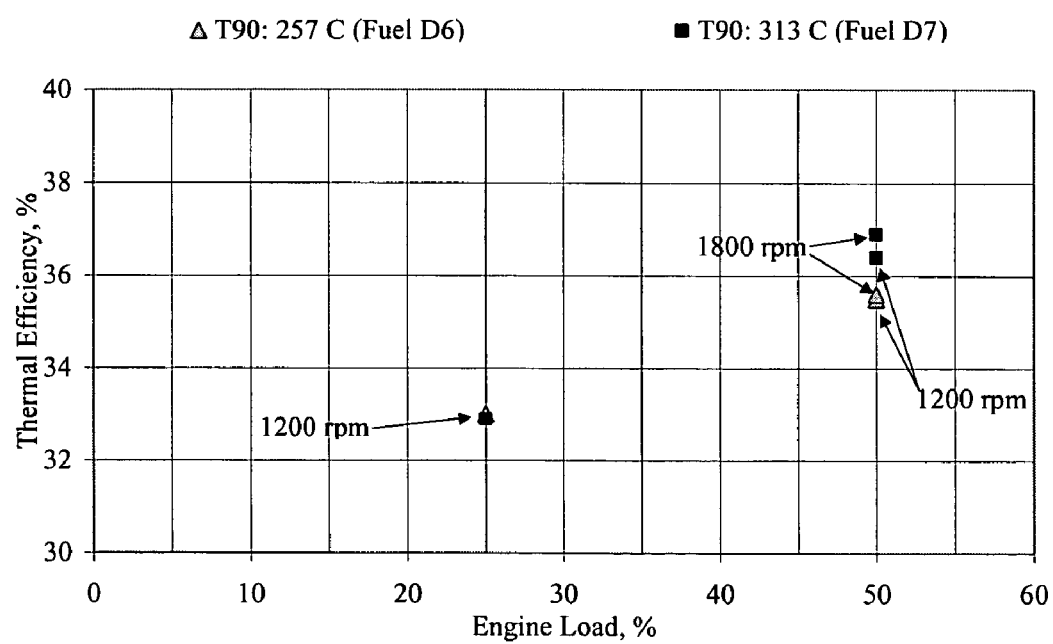

As shown in Tables 5 and 6, the engine was able to operate up to 78% load with diesel fuel D2 and up to 83% load with gasoline fuel G3. This demonstrates that a wide range of fuel volatility can be used in the engine. FIGS. 18 and 19 compare cylinder pressure and heat release rate for fuels D6 and D7. These fuels differed in volatility but their aromatic content and cetane number were well matched. Increased volatility had no significant effect on start of ignition timing and did not impact cylinder pressure, and rate of heat release.

The effect of fuel volatility on exhaust emissions and thermal efficiency is shown in FIGS. 20 through 24 for engine loads of 25 and 50%, by comparing D6 and D7. Increased volatility had a small effect on emissions and efficiency. NOx, smoke and HC emissions decreased with the more volatile fuel D6, while thermal efficiency was not affected. These effects could be caused by the more uniform distribution of the more volatile fuel D6 within the combustion chamber of the engine at the time of ignition. However, CO emissions results were mixed.

These results indicate that a broad range of fuel volatility types can be utilized in this engine. More volatile fuels like kerosene or gasoline can provide emission benefits due to better fuel vaporization and mixing. There are also benefits to using less volatile fuels like diesel since these fuels have higher energy density and will therefore provide better mileage, which is very important to the trucking industry which is a known large consumer of diesel fuels.

What is claimed is:

1. A method for operating a direct injected homogeneous charge compression ignition engine so as to reduce $NO_x$ exhaust emissions below 20 ppm by combusting in said engine in which fuel is injected during the compression stroke, a fuel having a cetane number as determined by ASTM D613 or derived cetane number as determined by ASTM D6890 is in a range from 20 to less than 45, a total aromatics content equal or greater than 15 wt %, and a boiling range of less than 340° C.

2. The method of claim 1, wherein the fuel cetane number is in a range from 20 to 40.

3. The method of claim 1, wherein the fuel cetane number is in a range from 20 to 30.

4. The method of claim 1, wherein the total aromatics content of the fuel is equal to or greater than 28 wt %.

5. The method of claim 1, wherein the total aromatics content of the fuel is in a range from 28 wt % to 50 wt %.

6. The method of claim 2, wherein the total aromatics content of the fuel is equal to or greater than 28 wt %.

7. The method of claim 3, wherein the total aromatics content of the fuel is equal to or greater than 28 wt %.

8. The method of claim 2, wherein the total aromatics content of the fuel ranges from 28 wt % to 50 wt %.

9. The method of claim 3, wherein the total aromatics content of the fuel ranges from 28 wt % to 50 wt %.

10. The method of claim 1, wherein said fuel has a boiling temperature range from 25° C. to less than 340° C.

11. The method of claim 1, wherein for gasoline fuels the average of research and motor octane numbers, (R+M)/2, is in the range of 60 to 91.

12. The method of claim 1, wherein for gasoline fuels the average of research and motor octane numbers, (R+M)/2, is in the range of 60 to 81.

13. The method of claim 1, wherein for gasoline fuels the average of research and motor octane numbers, (R+M)/2, is in the range of 60 to 70.

14. A method for operating a direct injected homogeneous charge compression ignition engine so as to reduce $NO_x$ exhaust emissions below 20 ppm by combusting in said engine, in which fuel is injected during the compression stroke, a fuel having a cetane number as determined by ASTM D613 or derived cetane number as determined by ASTM D6890 equal to or less than 45, a total aromatics content equal to or greater than 15 wt %, and a boiling range of less than 340° C.

15. The method of claim 14, wherein the total aromatic content of the fuel is equal to or greater than 28 wt %.

16. The method of claim 14, wherein the total aromatic content of the fuel ranges from 28 wt % to 50 wt %.

17. The method of claim 14, wherein said fuel has a boiling temperature range from 25° C. to less than 340° C.

18. The method of claim 14, wherein for gasoline fuels the average of research and motor octane numbers, (R+M)/2, is in the range of 60 to 91.

19. The method of claim 14, wherein for gasoline fuels the average of research and motor octane numbers, (R+M)/2, is in the range of 60 to 81.

20. The method of claim 14, wherein for gasoline fuels the average of research and motor octane numbers, (R+M)/2, is in the range of 60 to 70.

* * * * *

UNITED STATES PATENT AND TRADEMARK OFFICE
CERTIFICATE OF CORRECTION

PATENT NO. : 7,131,402 B2
APPLICATION NO. : 11/115779
DATED : March 24, 2008
INVENTOR(S) : Kevin P. Duffy et al.

Page 1 of 2

It is certified that error appears in the above-identified patent and that said Letters Patent is hereby corrected as shown below:

SPECIFICATION:
In Columns 3-4, Table 1, delete

"

TABLE 1

Properties of Diesel Test Fuels

| PARAMETER | Test Method | FUEL | | | | | |
|---|---|---|---|---|---|---|---|
| | | D0 | D1* | D2 | D3 | D4 | D5 |
| Density, g/cm3 | ASTM D4052 | 0.8502 | 0.8674 | 0.9109 | 0.8673 | 0.8503 | 0.8138 |
| Cetane Number | ASTM D613 | 44.7 | 45.9 | 31.7 | 38.5 | 45.5 | 46.2 |
| Distillation, F  IBP | ASTM D86 | 317 | 349 | 482 | 349 | 368 | 359 |
| 5% | | 371 | 396 | 498 | 396 | 403 | 374 |
| 10% | | 399 | 415 | 509 | 415 | 411 | 375 |
| 20% | | 441 | 439 | 506 | 439 | 425 | 381 |
| 30% | | 474 | 462 | 512 | 462 | 442 | 387 |
| 40% | | 499 | 485 | 518 | 485 | 458 | 400 |
| 50% | | 520 | 507 | 527 | 507 | 481 | 430 |
| 60% | | 539 | 531 | 536 | 531 | 503 | 540 |
| 70% | | 559 | 555 | 549 | 555 | 537 | 604 |
| 80% | | 584 | 586 | 567 | 586 | 579 | 613 |
| 90% | | 618 | 625 | 597 | 625 | 615 | 622 |
| 95% | | 647 | 655 | 627 | 655 | 635 | 632 |
| EP | | 662 | 671 | 630 | 671 | 649 | 641 |
| SFC Aromatics, wt % | 1-ring  2+ ring  Total | ASTM D5186 | 28.6  14.8  43.4 | 37.5  9.2  46.7 | 28.6  14.8  43.4 | 29.3  15.4  44.7 | 27.4  3.1  30.5 |
| | | 28.0 | | | | | |

*Fuel D3 treated with 0.3 vol % of ethylhexyl nitrate cetane improver
**Fuel D9 treated with 0.15 vol % of ethylhexyl nitrate cetane improver
***Fuel D9 treated with 0.4 vol % of ethylhexyl nitrate cetane improver

"

UNITED STATES PATENT AND TRADEMARK OFFICE
CERTIFICATE OF CORRECTION

PATENT NO. : 7,131,402 B2
APPLICATION NO. : 11/115779
DATED : March 24, 2008
INVENTOR(S) : Kevin P. Duffy et al.

It is certified that error appears in the above-identified patent and that said Letters Patent is hereby corrected as shown below:

And insert

--  --

TABLE 1 - Properties of Diesel Test Fuels

| PARAMETER | | Test Method | FUEL | | | | | | | | | | |
|---|---|---|---|---|---|---|---|---|---|---|---|---|---|
| | | | D0 | D1* | D2 | D3 | D4 | D5 | D6 | D7 | D8 | D9 | D10** | D11*** |
| Density, g/cm3 | | ASTM D4052 | 0.8502 | 0.8674 | 0.9109 | 0.8673 | 0.8303 | 0.8138 | 0.8165 | 0.8433 | 0.8326 | 0.8594 | 0.8594 | 0.8594 |
| Cetane Number | | ASTM D613 | 44.7 | 45.9 | 33.7 | 38.5 | 45.5 | 46.2 | 46.7 | 46.7 | 55.4 | 40.4 | 47.6 | 50.5 |
| Distillation, F | IB | ASTM D86 | 317 | 349 | 482 | 349 | 368 | 359 | 323 | 348 | 317 | 358.3 | 358.3 | 358.3 |
| | 5% | | 373 | 396 | 498 | 396 | 403 | 374 | 364 | 392 | 373 | 390.2 | 390.2 | 390.2 |
| | 10% | | 399 | 415 | 508 | 415 | 411 | 375 | 368 | 405 | 399 | 403.5 | 403.5 | 403.5 |
| | 20% | | 441 | 439 | 506 | 439 | 425 | 381 | 382 | 422 | 441 | 427.6 | 427.6 | 427.6 |
| | 30% | | 474 | 462 | 512 | 462 | 442 | 387 | 394 | 440 | 474 | 455.2 | 455.2 | 455.2 |
| | 40% | | 499 | 485 | 518 | 485 | 458 | 400 | 407 | 461 | 499 | 481.1 | 481.1 | 481.1 |
| | 50% | | 520 | 507 | 527 | 507 | 481 | 420 | 420 | 487 | 520 | 501.8 | 501.8 | 501.8 |
| | 60% | | 539 | 531 | 536 | 531 | 503 | 540 | 435 | 513 | 539 | 525.6 | 525.6 | 525.6 |
| | 70% | | 559 | 555 | 549 | 555 | 537 | 604 | 448 | 538 | 559 | 548.4 | 548.4 | 548.4 |
| | 80% | | 584 | 586 | 567 | 586 | 579 | 613 | 467 | 564 | 584 | 574.2 | 574.2 | 574.2 |
| | 90% | | 618 | 625 | 597 | 625 | 615 | 622 | 495 | 596 | 618 | 610.7 | 610.7 | 610.7 |
| | 95% | | 647 | 655 | 627 | 655 | 635 | 632 | 524 | 623 | 647 | 641.3 | 641.3 | 641.3 |
| | EP | | 662 | 673 | 630 | 673 | 649 | 643 | 554 | 634 | 662 | 662.7 | 662.7 | 662.7 |
| SFC Aromatics, wt% | 1-ring | ASTM D5186 | - | 28.6 | 37.5 | 28.6 | 29.3 | 27.4 | 20.2 | 20.7 | 20.3 | 23.4 | 23.4 | 23.4 |
| | 2+-ring | | - | 14.8 | 9.2 | 14.8 | 15.4 | 3.1 | 8.2 | 8.0 | 7.7 | 14.6 | 14.6 | 14.6 |
| | Total | | 28.0 | 43.4 | 46.7 | 43.4 | 44.7 | 30.5 | 28.4 | 28.7 | 28.0 | 38.0 | 38.0 | 38.0 |

* Fuel D1 treated with 0.3 vol% of ethylhexyl nitrate cetane improver
** Fuel D9 treated with 0.15 vol% of ethylhexyl nitrate cetane improver
*** Fuel D9 treated with 0.15 vol% of ethylhexyl nitrate cetane improver Signed and Sealed this Twenty-sixth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,131,402 B2
APPLICATION NO. : 11/115779
DATED : November 7, 2006
INVENTOR(S) : Kevin P. Duffy et al.

It is certified that error appears in the above-identified patent and that said Letters Patent is hereby corrected as shown below:

SPECIFICATION:
In Columns 3-4, Table 1, delete

"

TABLE 1

Properties of Diesel fuel fuels

| PARAMETER | Test Method | FUEL |  |  |  |  |  |
|---|---|---|---|---|---|---|---|
|  |  | D0 | D1* | D2 | D3 | D4 | D5 |
| Density, g/cm3 | ASTM D4052 | 0.8503 | 0.8674 | 0.9109 | 0.8673 | 0.8503 | 0.8138 |
| Cetane Number | ASTM D613 | 44.7 | 45.9 | 31.7 | 38.5 | 45.5 | 46.2 |
| Distillation, F IBP | ASTM D86 | 317 | 349 | 482 | 349 | 368 | 359 |
| 5% |  | 371 | 306 | 498 | 396 | 403 | 374 |
| 10% |  | 399 | 415 | 500 | 415 | 411 | 375 |
| 20% |  | 441 | 439 | 506 | 439 | 425 | 381 |
| 30% |  | 474 | 462 | 512 | 462 | 442 | 387 |
| 40% |  | 499 | 485 | 518 | 485 | 458 | 400 |
| 50% |  | 520 | 507 | 527 | 507 | 481 | 430 |
| 60% |  | 539 | 531 | 536 | 531 | 503 | 540 |
| 70% |  | 559 | 555 | 549 | 553 | 537 | 604 |
| 80% |  | 584 | 586 | 567 | 586 | 579 | 613 |
| 90% |  | 618 | 625 | 597 | 625 | 615 | 622 |
| 95% |  | 647 | 655 | 627 | 655 | 635 | 632 |
| EP |  | 662 | 671 | 630 | 671 | 649 | 641 |
| SFC | 1-ring | ASTM D5186 |  | 28.6 | 37.5 | 28.6 | 29.3 | 27.4 |
| Aromatics, | 2+-ring |  |  | 14.8 | 9.2 | 14.8 | 15.4 | 3.1 |
| wt % | Total |  | 28.0 | 43.4 | 46.7 | 43.4 | 44.7 | 30.5 |

*Fuel D3 treated with 0.3 vol % of ethylhexyl nitrate cetane improver
**Fuel D9 treated with 0.15 vol % of ethylhexyl nitrate cetane improver
***Fuel D9 treated with 0.4 vol % of ethylhexyl nitrate cetane improver

"

UNITED STATES PATENT AND TRADEMARK OFFICE
CERTIFICATE OF CORRECTION

PATENT NO. : 7,131,402 B2
APPLICATION NO. : 11/115779
DATED : November 7, 2006
INVENTOR(S) : Kevin P. Duffy et al.

It is certified that error appears in the above-identified patent and that said Letters Patent is hereby corrected as shown below:

And insert

--  --

This certificate supersedes the Certificate of Correction issued August 26, 2008.

Signed and Sealed this

Twenty-third Day of September, 2008

JON W. DUDAS
*Director of the United States Patent and Trademark Office*